United States Patent
Czasch et al.

(10) Patent No.: US 8,825,282 B2
(45) Date of Patent: Sep. 2, 2014

(54) METHOD FOR IDENTIFYING A SHORT CIRCUIT TO THE POSITIVE TERMINAL OF A BATTERY AND CIRCUIT DEVICE FOR CARRYING OUT THE METHOD

(75) Inventors: Martin Czasch, Winnenden (DE); Bernd Schelling, Stuttgart (DE); Patrick Bauer, Stuttgart (DE); Mehmet Oencel, Boennigheim (DE); Ralph Bauer, Esslingen (DE); Thomas Holst, Stuttgart (DE); Georg Hoegele, Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/579,127
(22) PCT Filed: Mar. 1, 2011
(86) PCT No.: PCT/EP2011/053008
  § 371 (c)(1),
  (2), (4) Date: Aug. 15, 2012
(87) PCT Pub. No.: WO2011/113689
  PCT Pub. Date: Sep. 22, 2011

(65) Prior Publication Data
  US 2012/0310476 A1  Dec. 6, 2012

(30) Foreign Application Priority Data
  Mar. 16, 2010 (DE) .......................... 10 2010 002 899

(51) Int. Cl.
  G06F 11/30   (2006.01)
  B60R 16/023  (2006.01)
(52) U.S. Cl.
  CPC .................................. B60R 16/0232 (2013.01)
  USPC ........................................................ 701/34.4

(58) Field of Classification Search
  CPC ................ F02D 2041/2093; F02D 2041/2089; F02D 2041/20
  USPC .................................................. 701/34.4, 34
  See application file for complete search history.

(56) References Cited

U.S. PATENT DOCUMENTS

| 7,345,383 B2 * | 3/2008 | Zushi et al. .................... 307/130 |
| 2006/0163946 A1 | 7/2006 | Henne et al. |
| 2007/0103006 A1 * | 5/2007 | Zushi et al. .................... 307/130 |
| 2011/0270489 A1 * | 11/2011 | Gustmann et al. ............... 701/36 |

FOREIGN PATENT DOCUMENTS

| CN | 1917329 | 2/2007 |
| CN | 101350531 | 1/2009 |
| DE | 102008040810 | 2/2010 |

OTHER PUBLICATIONS

PCT/EP2011/053008 International Search Report dated Jun. 1, 2011 (Translation and Original, 4 pages).

* cited by examiner

Primary Examiner — Mary Cheung
Assistant Examiner — Anne Mazzara
(74) Attorney, Agent, or Firm — Michael Best & Friedrich LLP

(57) ABSTRACT

A method for identifying a short circuit to the positive terminal of a battery in a circuit of a motor vehicle. An electronic circuit breaker HS (123) is actuated by a control device (120) and has at least one electrical switch which switches on and off loads (110, 111, 112), the switching state of said switches being reported to the control device (120) and determines that operation is fault-free when the connected loads (110, 111, 112) are supplied with voltage when the electronic circuit breaker HS (123) is switched on and a "short circuit" or "load drop" message is produced at the circuit breaker when the electronic circuit breaker HS (123) is switched off, switching off the supply voltage by the electronic circuit breaker HS (123) is detected at the end of a driving cycle of the motor vehicle. A fault is determined when a "short circuit" or "load drop" message is not produced at the electrical switch.

8 Claims, 1 Drawing Sheet

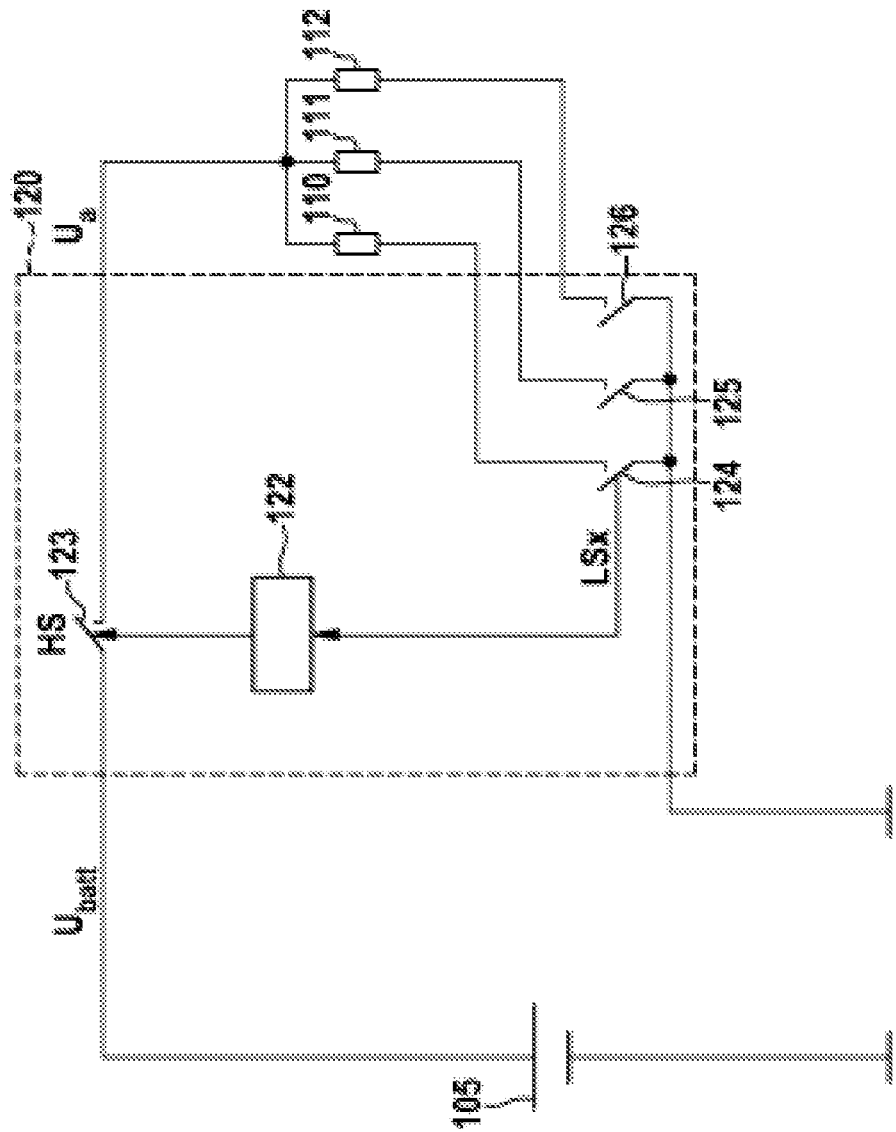

METHOD FOR IDENTIFYING A SHORT CIRCUIT TO THE POSITIVE TERMINAL OF A BATTERY AND CIRCUIT DEVICE FOR CARRYING OUT THE METHOD

BACKGROUND OF THE INVENTION

The invention relates to a method for identifying a short circuit to the positive terminal of a battery in an electrical circuit of a motor vehicle having an electronic power switch that can be actuated by a control device and having at least one electrically operated switch, preferably a plurality of electrically operated switches, that switch(es) on and off loads, the switched state of said switches being reported to the control device and it being concluded that the operation is then fault-free when the connected loads are supplied with voltage when the electronic power switch is switched on and a "short circuit" or "load drop" message is produced at the switches that switch on and off loads when the electronic power switch is switched off.

Objects of the present invention are also a circuit device that comprises an electronic module and is embodied in such a manner as to be suitable for carrying out the method, and also a computer program and a computer program product that are likewise suitable for carrying out the method.

Modern vehicles are provided in the control device with electronic power switches in engine control devices, which switches switch on and off the battery voltage of one or a plurality of loads. These switches are electronic switches and perform substantially the function of an electronic master relay. However, they are encumbered with the problem that it is not possible using these electronic switches to identify a short circuit to the positive terminal of a battery at the output of the power switch. The object of the invention is therefore to provide a method that renders it possible to identify a short circuit to the positive terminal of a battery at the output of the power switch in a manner that is simple to perform.

SUMMARY OF THE INVENTION

This object is achieved by a method for identifying a short circuit to a positive terminal of a battery in an electrical circuit of a motor vehicle of the type described in the introduction by virtue of the fact that at the end of a driving cycle of the motor vehicle the voltage supply is defined by means of the electronic power switch and purposefully switched off and that the switched state is identified on each electrically operated switch that switches on and off loads and then, if no error message indicating lack of operating voltage is produced, it is consequently concluded that voltage is still being supplied to the relevant power switch. In this case, the error is classified as a "short circuit to the positive terminal of the battery" and a corresponding error code is broadcast by the control device.

The invention utilizes the return signals that are generally available nowadays in vehicles and are sent to the control device or to the control device of the vehicle by the electrically operated switches that switch on and off electrical load. The invention uses the error message matched with the switched state of the electronic power switch to identify an error as a result of the short circuit to the positive terminal of the battery.

An error can be identified using a logic system, insofar as the error recognition procedure can be part of an electronic logic module that in turn can be a part of the control device.

In addition, the logic can also be achieved using a computer program that is implemented in the control device of the internal combustion engine. As the hardware that comprises the electronic power switch and, individually, the switches that switch on and off loads are already available in vehicles, the method can be upgraded in this manner, wherein the upgrade is performed in a simple manner by reading in a program that is stored, for example, on a computer program product such as a DVD, an external memory device, an external computer or the like.

BRIEF DESCRIPTION OF THE DRAWINGS

An exemplary embodiment of the invention is illustrated in the drawing and explained in detail in the following description.

DETAILED DESCRIPTION

The FIGURE is a schematic illustration of an electrical current supply of a vehicle in a control device 120. A vehicle battery 105 supplies a battery voltage $U_{batt}$ that is present at an input of a control device 120. Loads 110, 111, 112 of the vehicle are switched on and off by means of electronic switches 124, 125, 126 that are arranged in the control device 120, the switching signals LSx of said electronic switches being directed to a logic module 122, wherein x represents the relevant switch, i.e., for example, LS124 represents the switch 124, LS125 represents the switch 125 and LS 126 represents the switch 126. The loads are represented in the FIGURE as ohmic resistances. The voltage $U_a$ is supplied to the loads 110, 111, 112 by virtue of the switches 124, 125, 126. The voltage $U_a$ is the output voltage that is present at the output of the control device 120. The logic module 122 actuates an electronic power switch HS that is designated by the reference numeral 123 in the FIGURE. When the electronic power switch HS 123 is switched on, the voltage $U_a=U_{batt}$ is present at the output of the control device 120. All the loads can be separated from the battery voltage $U_{batt}$ or connected to the battery voltage $U_{batt}$ using the electronic power switch HS 123.

"Error messages" in the form of switching signals LSx are reported to the electronic module 122 by the switches 124, 125, 126. If, for example, the electronic power switch HS 123 is switched on and the connected loads 110, 111, 112 are supplied with voltage, an error message is not reported to the logic module 122 in the event that the switches 124, 125, 126 are functioning in the proper manner. If the electronic power switch HS 123 is switched off and consequently voltage is not being supplied to the loads, the electronic (power) switches 124, 125, 126 that switch on and off loads produce in this case either a "short circuit" or "load drop" error message.

The fundamental idea of the invention is now to use the error messages of the electronic switches 124, 125, 126 to identify a short circuit to the positive terminal of a battery. A short circuit to a positive terminal of a battery, i.e. to the voltage supply, basically corresponds to the fact that the continuous voltage supply "at the" electronic power switch HS 123 has "ceased". In order to be able to identify an error of this type, the voltage supply is purposefully switched off at the end of a driving cycle. This means that the electronic power switch HS 123 is opened by the logic module 122. In this case, an error message is expected at the switches 124, 125, 126 owing to a lack of battery voltage. However, if an error message is not produced, it can be concluded therefrom that voltage is still being supplied, although the supply has already been switched off. This status is interpreted as an error "short circuit to the positive terminal of a battery" and stored in the control device 120 and/or broadcast in a correspondingly known error code.

The logic module 122 can be part of the control device 120 and in this respect can represent a switching part of the control device 120. However, it can also be embodied as a computer program that is implemented in the control device 120. The program itself can be stored on a data carrier and in this respect existing control devices can be upgraded.

The invention claimed is:

1. A method for identifying a short circuit to a positive terminal of a battery in an electrical circuit of a motor vehicle having an electronic power switch (123) that is actuated by a control device (120) and having at least one electrically operated switch that switch(es) on and off loads (110, 111, 112), a switched state of said at least one electrically operated switch being reported to the control device (120), the method comprising:

determining that an operation is fault-free when the loads (110, 111, 112) are supplied with voltage when the electronic power switch (123) is switched on and a "short circuit" or "load drop" message is produced at the at least one electrically operated switch when the electronic power switch (123) is switched off, and determining that there is an error when a "short circuit" or "load drop" message is not produced at the at least one electrically operated switch at the end of a driving cycle of the motor vehicle when the voltage supply is switched off by the electronic power switch (123).

2. The method as claimed in claim 1, characterized in that the error is classified as a "short circuit to the positive terminal of a battery" and a corresponding error code is broadcast by the control device (120).

3. A circuit device for identifying a short circuit to a positive terminal of a battery in an electrical circuit of a motor vehicle comprising a logic module (122) for carrying out the method as claimed in claim 1.

4. A computer program that performs all the steps of a method as claimed in claim 1, said computer program running on the control device (120) in an internal combustion engine.

5. The method as claimed in claim 1, wherein the at least one electrically operated switch is a plurality of electrically operated switches (124, 125, 126).

6. The method as claimed in claim 5, wherein the switched stated is identified at each of the plurality of electrically operated switches (124, 125, 126).

7. A computer program product having a program code that is stored on a non-transitory machine-readable carrier for carrying out a method for identifying a short circuit to a positive terminal of a battery in an electrical circuit of a motor vehicle having an electronic power switch (123) that is actuated by a control device (120) and having at least one electrically operated switch that switch(es) on and off loads (110, 111, 112), a switched state of said at least one electrically operated switch being reported to the control device (120), the method comprising:

determining that an operation is fault-free when the loads (110, 111, 112) are supplied with voltage when the electronic power switch (123) is switched on and a "short circuit" or "load drop" message is produced at the at least one electrically operated switch when the electronic power switch (123) is switched off, and determining that there is an error when a "short circuit" or "load drop" message is not produced at the at least one electrically operated switch at the end of a driving cycle of the motor vehicle when the voltage supply is switched off by the electronic power switch (123), if the program is performed on a computer of a vehicle.

8. The computer program product of claim 7, wherein the computer program is performed on is a control device (120) of the vehicle.

\* \* \* \* \*